(12) United States Patent
Szabo et al.

(10) Patent No.: US 10,349,452 B2
(45) Date of Patent: Jul. 9, 2019

(54) TECHNIQUE FOR PROVIDING QUALITY ENHANCEMENTS TO AN APPLICATION RESIDING ON A USER TERMINAL

(71) Applicant: Telefonaktiebolaget LM Ericsson (publ), Stockholm (SE)

(72) Inventors: Geza Szabo, Kecskemet (HU); György Miklós, Pilisborosjenö (HU); Sándor Rácz, Cegléd (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 33 days.

(21) Appl. No.: 15/528,162

(22) PCT Filed: Dec. 30, 2014

(86) PCT No.: PCT/EP2014/079472
§ 371 (c)(1),
(2) Date: May 19, 2017

(87) PCT Pub. No.: WO2016/107654
PCT Pub. Date: Jul. 7, 2016

(65) Prior Publication Data
US 2017/0339729 A1 Nov. 23, 2017

(51) Int. Cl.
*H04W 76/12* (2018.01)
*H04L 12/851* (2013.01)
(Continued)

(52) U.S. Cl.
CPC ......... *H04W 76/12* (2018.02); *H04L 12/4641* (2013.01); *H04L 43/028* (2013.01);
(Continued)

(58) Field of Classification Search
CPC ............. H04W 76/12; H04W 28/0268; H04W 28/0252; H04W 88/02; H04L 47/2441; H04L 43/028; H04L 12/4641
See application file for complete search history.

(56) References Cited

U.S. PATENT DOCUMENTS

2004/0221053 A1 11/2004 Codella et al.
2009/0231999 A1* 9/2009 Verma ................. H04L 41/5003
370/235

(Continued)

FOREIGN PATENT DOCUMENTS

WO 2014175796 A1 10/2014

OTHER PUBLICATIONS

Kulik, I. et al., "Analysis of the Relationship between Quality of Experience and Service Attributes for 3D Future Internet Multimedia", 2013 IEEE 4th International Conference on Cognitive Infocommunications (CogInfoCom), Dec. 2-5, 2013, pp. 1-6.

(Continued)

*Primary Examiner* — Omar J Ghowrwal
(74) *Attorney, Agent, or Firm* — Coats & Bennett, PLLC

(57) ABSTRACT

A technique for providing VPN-based quality enhancement to applications running on a user terminal is presented. An exemplary user terminal comprises at least one interface configured to connect the user terminal to a network, at least one processor and at least one memory coupled to the processor. The memory stores a quality enhancement application and at least one further application for execution by the processor. The quality enhancement application, in one variant, is configured to cause the processor to trigger a VPN service to establish a VPN tunnel between a first VPN tunnel endpoint and a second VPN tunnel endpoint, wherein the first VPN tunnel endpoints resides on the user terminal. The quality enhancement application is further configured to cause the processor to determine a quality enhancement (Continued)

requirement of the further application and to signal the quality enhancement requirement via the VPN tunnel to the network.

27 Claims, 9 Drawing Sheets

(51) Int. Cl.
   *H04L 12/26* (2006.01)
   *H04L 12/46* (2006.01)
   *H04W 28/02* (2009.01)
   *H04W 88/02* (2009.01)

(52) U.S. Cl.
   CPC ..... *H04L 47/2441* (2013.01); *H04W 28/0252* (2013.01); *H04W 28/0268* (2013.01); *H04W 88/02* (2013.01)

(56) References Cited

U.S. PATENT DOCUMENTS

2012/0230345 A1 9/2012 Ovsiannikov
2013/0226992 A1 8/2013 Bapst et al.

OTHER PUBLICATIONS

Opera, "Opera Max Android Data management and privacy app", pp. 1-2, retrieved on May 18, 2017, retrieved from Internet http://www.opera.com/apps/max.

Nokia, "5670 Reporting and Analysis Manager", pp. 1-2, retrieved on May 18, 2017, retrieved from Internet https://networks.nokia.com/products/5670-reporting-and-analysis-manager.

Hide My Ass, "Liberty Has Landed", pp. 1-3, retrieved on May 18, 2017, retrieved from Internet https://www.hidemyass.com/.

* cited by examiner

TECHNIQUE FOR PROVIDING QUALITY ENHANCEMENTS TO AN APPLICATION RESIDING ON A USER TERMINAL

TECHNICAL FIELD

The present disclosure generally relates to providing a quality enhancement in relation to an application residing on a user terminal. The enhancement may be at least one of a Quality of Service (QoS) and a Quality of Experience (QoE) enhancement. The technique of the present disclosure may be embodied in methods, apparatuses and computer programs.

BACKGROUND

Network operators constantly strive to improve the quality of their services in terms of QoS and QoE. QoE typically describes a quality perception from the perspective of a user, while QoS is normally not restricted to a user perception. As such, QoS enhancements often also lead to a better QoE.

In the current $3^{rd}$ Generation Partnership Project (3GPP) architecture, QoS is supported via the so-called bearer concept. Starting from Release 7 for 3G and Release 8 for Long Term Evolution (LTE), traffic differentiation takes place in the network (also referred to as network-initiated bearer concept) for QoS control. In general, the network operator takes responsibility for setting up the appropriate set of bearers for an individual user terminal and for setting the associated bearer parameters.

For classifying data traffic (typically in the form of data packets) and assigning the classified data traffic to individual bearers, in the downlink direction packet filters (e.g., via Traffic Flow Templates, TFTs) or Deep Packet Inspection (DPI) may be applied. The network operator may also upload TFTs to the user terminal to assign data traffic to individual bearers in the uplink direction.

The network-initiated bearer concept has been motivated by the idea to not rely on the user terminal to autonomously decide about bearer assignments and bearer parameters for QoS enforcement. It has been found that developers of user terminal applications often do not have proper knowledge and experience to set bearer parameters and classify traffic for bearer assignment.

Today, an increasing amount of data traffic, such as Over-The-Top (OTT) Internet traffic, is encrypted. Often, end-to-end encryption technologies are used, which makes it difficult or even impossible for a network operator to apply packet filtering or DPI for classifying the data traffic in the network. Under such circumstances, possibilities of the network operator for providing QoS and QoE enhancements are significantly reduced.

SUMMARY

Accordingly, there is a need for technique that avoids one or more of the problems discussed above, or other problems.

In a first aspect, there is provided a user terminal comprising at least one interface configured to connect the user terminal to a network, at least one processor, and at least one memory coupled to the processor, the memory storing a quality enhancement application and at least one further application for execution by the processor. The quality enhancement application is configured to cause the processor to trigger a Virtual Private Network (VPN) service to establish a VPN tunnel between a first VPN tunnel endpoint and a second VPN tunnel endpoint, wherein the first VPN tunnel endpoint resides on the user terminal, to determine a quality enhancement requirement of the further application and to signal the quality enhancement requirement via the VPN tunnel to the network.

The quality enhancement application is in one variant configured to cause the processor to determine the quality enhancement requirement by an analysis of an execution behaviour of the further application. The further application may be associated with a first Application Programming interface (API) configured to access data indicative of the execution behaviour of the further application.

The quality enhancement application may in addition, or as an alternative, be configured to cause the processor to determine the quality enhancement requirement by an analysis of data traffic of the further application. In such a case a second API may be provided. The second API may be configured to access the data traffic of the further application for data traffic analysis. The second API may generally be associated with (e.g., provided by) the VPN service.

The quality enhancement application may be configured to cause the processor to signal the quality enhancement requirement via packet marking. As an example, the quality enhancement application may be configured to cause the processor to perform the packet marking using the VPN service (e.g., via the second API).

The quality enhancement application may be configured to cause the processor to apply the packet marking to packets sent by the further application. The quality enhancement application may also be configured to cause the processor to signal the quality enhancement requirement via dedicated signalling. Such dedicated signalling may not be performed via the packets sent by the further application.

The quality enhancement application may be configured to cause the processor to locally enforce the quality enhancement requirement at the user terminal with respect to data traffic directed to or received from the network. To this end, traffic shaping techniques may be applied.

The second VPN tunnel endpoint may reside on the user terminal. Alternatively, the second VPN tunnel endpoint may reside outside the user terminal in the network.

Also provided is in a second aspect a user terminal comprising at least one interface configured to connect the user terminal to a network, at least one processor, and at least one memory coupled to the processor, the memory storing a quality enhancement application and at least one further application for execution by the processor. The quality enhancement application is configured to cause the processor to trigger activation of a VPN service that resides on the user terminal, wherein the VPN service is associated with an API configured to access data traffic of the further application, to determine a quality enhancement requirement of the further application by an analysis of the data traffic of the further application, wherein the data traffic analysis is performed via the API, and to perform at least one action selected from signalling the quality enhancement requirement to the network and locally enforcing the quality enhancement requirement at the user terminal with respect to data traffic directed to or received from the network.

In the second aspect, the quality enhancement application may be configured to cause the processor to signal the quality enhancement requirement by packet marking using the VPN service. The packet marking may be performed via the API.

In one implementation, the quality enhancement application is configured to cause the processor to locally enforce the quality enhancement requirement at the user terminal by rate limitation or blocking with respect to data traffic directed towards the network and/or by a Transport Control Protocol (TCP) related action with respect to data traffic from the network.

According to a third aspect, there is provided a user terminal comprising at least one interface configured to connect the user terminal to a network, at least one processor, and at least one memory coupled to the processor, the memory storing a quality enhancement application and at least one further application for execution by the processor. The quality enhancement application is configured to cause the processor to trigger activation of a VPN service that resides on the user terminal, to determine a quality enhancement requirement of the further application, and to signal the quality enhancement requirement to the network by packet marking, wherein packet marking is performed using the VPN service.

In the third aspect, the VPN service may be associated with an API configured to access the data traffic of the further application. Packet marking may be performed via the API. In such a case, the quality enhancement application may further be configured to cause the processor to determine the quality enhancement requirement of the further application by an analysis of data traffic of the further application, wherein the data traffic analysis is performed via the API.

In the third aspect, the quality enhancement application may be configured to cause the processor to locally enforce the quality enhancement requirement at the user terminal with the respect to data traffic directed to or received from the network.

In the second and third aspects, the quality enhancement application may be configured to cause the processor to trigger the VPN service to establish a VPN tunnel between a first VPN tunnel endpoint and a second VPN tunnel endpoint. The first VPN tunnel endpoint and the second VPN tunnel endpoint may reside on the user terminal.

Further, the quality enhancement application may be configured in the second and third aspects to cause the processor to determine the quality enhancement requirement by an analysis of an execution behaviour of the further application. To this end a dedicated API may be provided per further application.

In any of the user terminal aspects, the VPN service may be provided by an operating system of the user terminal.

In any of the user terminal aspects, the quality enhancement application may be configured to cause the processor to signal the quality enhancement requirement on one of a packet-by-packet basis and a packet flow basis. A dedicated packet flow may be associated with each further application.

In any of the user terminal aspects, the data traffic may be end-to-end encrypted data traffic.

In any of the user terminal aspects, the quality enhancement requirement may be an unspecified notification indicating that traffic differentiation is required for the signalling user terminal (e.g., so as to achieve the quality enhancement). A decision regarding a suitable traffic differentiation action may then be performed in the network.

Also provided is a network component system comprising at least one interface configured to be connected to a user terminal, at least one processor, and at least one memory coupled to the at least one processor. The memory stores at least one program configured to cause the at least one processor to trigger a VPN service to establish a VPN tunnel between a first VPN tunnel endpoint and a second VPN tunnel endpoint, wherein the first VPN tunnel endpoint resides on the user terminal and the second VPN tunnel endpoint resides on a first network component, and to process, at the first network component or an optional second network component connected to the first network component, a quality enhancement requirement received from the user terminal via the VPN tunnel.

For the network component system the quality enhancement requirement may be an unspecified notification indicating that traffic differentiation is required for the signalling user terminal.

Further, the at least one program may be configured to cause the at least one processor of the first, the optional second or an optional third network component to perform a quality enhancement action (e.g., using traffic differentiation). The quality enhancement action may include at least one of prioritizing data traffic directed towards the user terminal, associating data traffic directed towards the user terminal with a particular Channel Quality Indication (CQI), associating data traffic directed towards the user terminal with a particular Weighted Fair Queuing (WFQ), weight, establishing at least one particular bearer for data traffic directed towards the user terminal, setting at least one bearer parameter for data traffic directed towards the user terminal, and classifying data traffic directed towards the user terminal onto at least one particular bearer.

The first network component may be a Traffic Differentiation Function (TDF) configured to also process the quality enhancement requirement.

Also provided is a network system comprising the user terminal presented herein and the network component system presented herein.

Further provided is a method of operating a user terminal comprising at least one interface configured to connect the user terminal to a network, at least one processor and at least one memory coupled to the processor, the memory storing at least one application for execution by the processor, wherein the method comprises triggering a VPN service to establish a VPN tunnel between a first VPN tunnel endpoint and a second VPN tunnel endpoint, wherein the first VPN tunnel endpoint resides on the user terminal, determining a quality enhancement requirement of the application, and signalling the quality enhancement requirement via the VPN tunnel to the network.

Further provided is a method of operating a user terminal comprising at least one interface configured to connect the user terminal to a network, at least one processor, and at least one memory coupled to the processor, the memory storing at least one application for execution by the processor, wherein the method comprises triggering activation of a VPN service that resides on the user terminal, wherein the VPN service is associated with an API configured to access data traffic of the application, determining a quality enhancement requirement of the application by an analysis of the data traffic of the application, wherein the data traffic analysis is performed via the API, and performing at least one action selected from signalling the quality enhancement requirement to the network and locally enforcing the quality enhancement requirement at the user terminal with the respect to data traffic directed to or received from the network.

Also provided is a method of operating a user terminal comprising at least one interface configured to connect the user terminal to a network, at least one processor, and at least one memory coupled to the processor, the memory storing at least one application for execution by the processor, wherein the method comprises triggering activation of a VPN service that resides on the user terminal, determining a quality enhancement requirement of the application, and signalling the quality enhancement requirement to the network by packet marking using the VPN service.

Still further provided is a method of operating a network component or network component system comprising at least one interface configured to be connected to a user terminal, at least one processor, and at least one memory coupled to the at least one processor, the method comprising triggering a VPN service to establish a VPN tunnel between a first VPN tunnel endpoint and a second VPN tunnel endpoint, wherein the first VPN tunnel endpoint resides on the user terminal and the second VPN tunnel endpoint resides in the network component system, and processing a quality enhancement requirement received from the user terminal via the VPN tunnel.

In a further aspect, there is provided a computer program product comprising program code portions for performing the methods and method aspects presented herein when the computer program product is executed on one or more computing devices. The computer program product may be stored on a computer readable recording medium, such as a semiconductor memory, DVD, CD-ROM, and so on. The computer program product may also be provided for download via a communication network (e.g., the Internet or a proprietary network).

Still further, it is to be noted that the methods and method aspects described herein may also be embodied in an apparatus comprising at least one processor and/or appropriate means for carrying out any one of the method steps.

BRIEF DESCRIPTION OF THE DRAWINGS

Embodiments of the technique presented herein are described herein below with reference to the accompanying drawings, in which.

DETAILED DESCRIPTION

In the following description, for purposes of explanation and not limitation, specific details are set forth (such as particular signalling steps and quality enhancement actions) in order to provide a thorough understanding of the technique presented herein. It will be apparent to one skilled in the art that the present technique may be practiced in other embodiments that depart from these specific details. For example, the embodiments will partially be described in the context of 3G or LTE networks; however, this does not rule out the use of the present technique in connection with (future) technologies consistent with 3G or LTE.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that when the following embodiments are described in the context of methods and method steps, the technique presented herein may also be embodied in a computer program product as well as in a system comprising a computer processor and a memory coupled to the processor, wherein the memory is encoded with one or more programs that execute the services, functions and steps disclosed herein.

Figure 1:
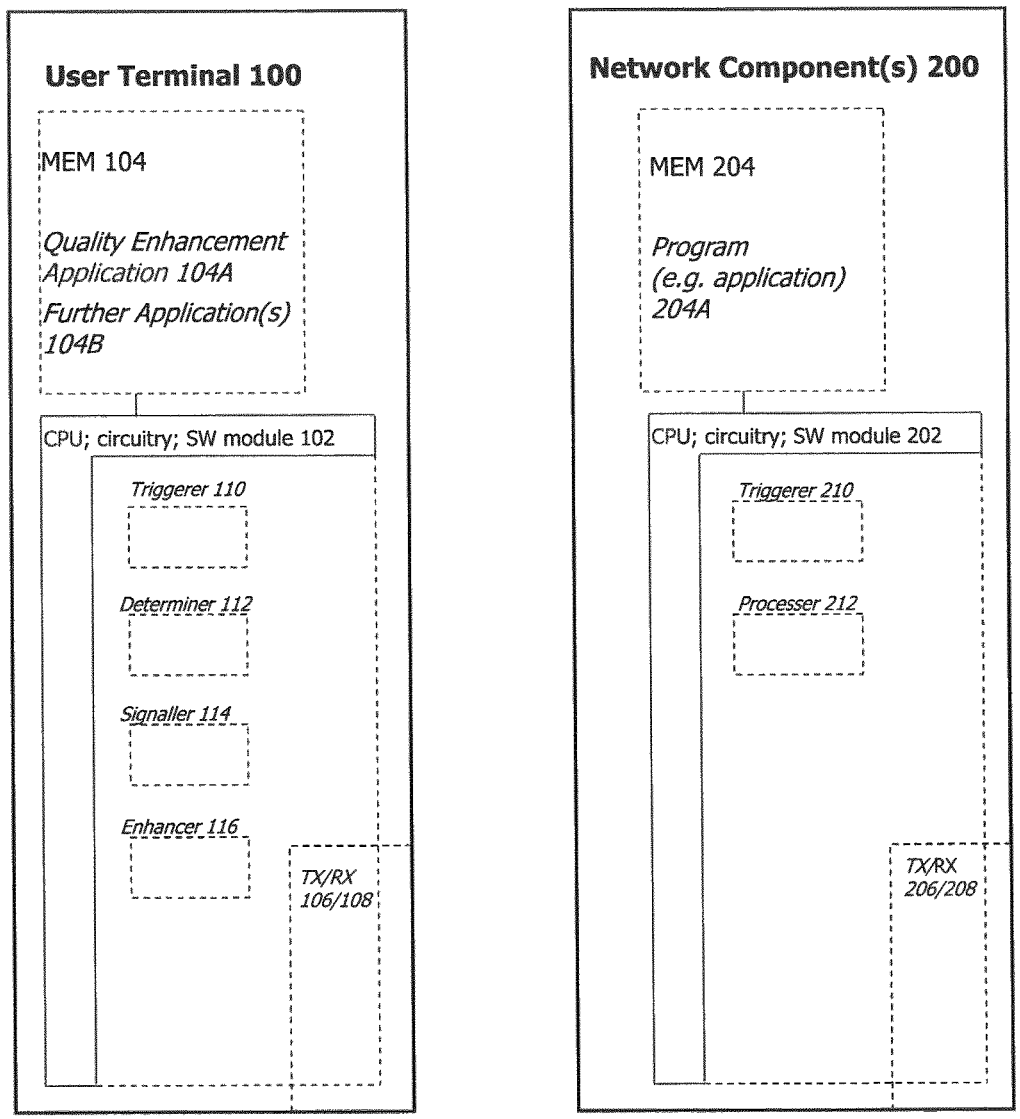
FIG. 1 shows functional entities comprised in exemplary apparatus embodiments.

FIG. 1 shows apparatus embodiments in a communications network in which aspects of the present disclosure can be performed. As illustrated in FIG. 1, the communications network comprises at least one user terminal 100 and one or more network components 200. The one or more network components 200 may belong to one or more of an access network, a core network of a network operator, or the Internet.

As shown in FIG. 1, the user terminal 100 comprises a core functionality (e.g., one or more of a Central Processing Unit, CPU, dedicated circuitry and/or a software module) 102, a memory (and/or database) 104, a transmitter 106, a receiver 108 and an optional display unit (not shown). Moreover, the user terminal 100 comprises a triggerer 110, a determiner 112, and at least one of a signaler 114 and an enhancer 116. In the memory 104 a quality enhancement application 104A as well as one or more further applications 104B are stored for execution by the core functionality 102. The user terminal 100 may take the form of any wireless or wired user terminal, such as a smartphone, a tablet computer or a PC.

In a similar manner, the one or more network components 200 each comprise a core functionality (e.g., one or more of a CPU, dedicated circuitry and/or a software module) 202, a memory (and/or database) 104, a transmitter 206 and a receiver 208. Moreover, the at least one network component 200 comprises a triggerer 210 and a processor 212. It should be noted that in certain variants, the triggerer 210 and the processor 212 may reside on different network components 200 directly or indirectly coupled to each other.

In the following paragraphs, index x=1 or 2 (for the user terminal 100 and the at least one network component 200). As partly indicated by the dashed extensions of the functional blocks of the CPUs x02, the triggerer 110, the determiner 112, the signaler 114, the enhancer 116 (of the user terminal 100) and the triggerer 210 and processor 212 (of the at least one network component 200) may at least partially be functionalities running on the CPUs x02, or may alternatively be separate functional entities or means controlled by the CPUs x02 and supplying the same with information. The transmitter and receiver components x06, x08 may be realized to comprise or constitute suitable interfaces (e.g., network interfaces) and/or suitable signal generation and evaluation functions.

The CPUs x02 may be configured, for example, using software residing in the memories x04 (e.g., an operating system or other system software), to process various data inputs and to control the functions of the memories x04, the transmitter x06 and the receiver x08 (as well as of the triggerer 110, the determiner 112, the signaler 114 and the enhancer 116 of the user terminal 100 and/or the triggerer 210 and the processor 212 of the at least one network component 200). The memories x04 may serve for storing program code for carrying out the methods and method steps according to the aspects disclosed herein, when executed by the CPU x02.

It is to be noted that the transmitter x06 and the receiver x08 may be provided as an integral transceiver, as is indicated in FIG. 1. It is further to be noted that the transmitters/receivers x06, x08 may be implemented as physical transmitters/receivers for transceiving via an air interface or a wired connection, as routing/forwarding entities/interfaces between network elements, as functionalities for writing/reading information into/from a given memory area or as any suitable combination of the above. At least one of the triggerer 110, determiner 112, signaler 114 and enhancer 116 of the user terminal 100 and the triggerer 210 and the processor 212 of the at least one network component 200, or the respective functionalities, may also be implemented as a chipset, module or subassembly.

Figure 2:
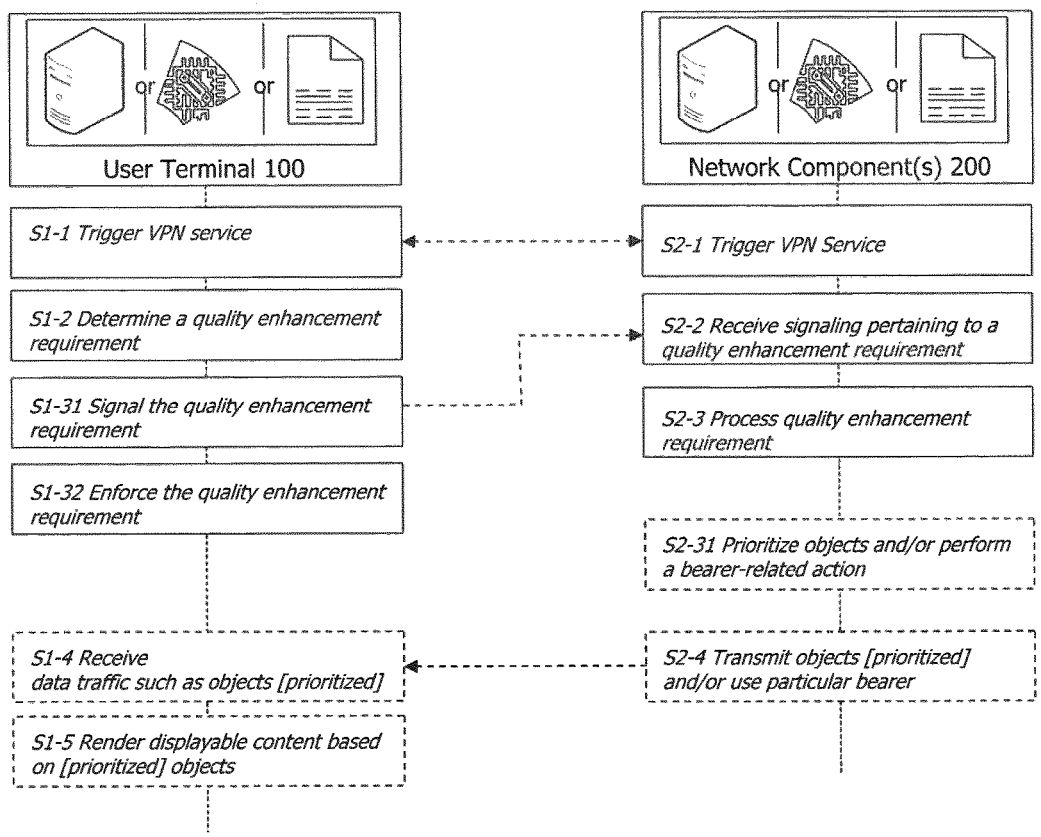
FIG. 2 shows a method embodiment which also reflects the interaction between the functional entities of the apparatus embodiments.

FIG. 2 shows a method embodiment which also reflects the interaction between the functional entities of the apparatus embodiment shown in FIG. 1. In the signalling diagram of FIG. 2, time aspects between signalling are reflected in the vertical arrangement of the signalling sequence as well as in the sequence numbers. It is to be noted that the time aspects indicated in FIG. 2 do not necessarily restrict any one of the method steps shown to the step sequence outlined in FIG. 2. This applies in particular to method steps that are functionally disjunctive with each other.

In the following description of exemplary method embodiments, the quality enhancement application 104A residing in the memory 104 of the user terminal 100 causes the CPU 102 of the user terminal 100 to perform the method steps discussed herein. In a similar manner, the program 204A residing in the memory 204 of the at least one network component 200 causes the CPU 202 of the at least one network component 200 to perform the method steps discussed herein. Accordingly, with reference to FIG. 1, the triggerer 110, the determiner 112, the signaler 114 and the enhancer 116 of the user terminal 100 as well as the triggerer 210 and the processor 212 of the at least one network component 200 may be regarded as functional entities of the quality enhancement application 104A and the program 204A, respectively.

In an initial step S1-1 the triggerer 110 of the user terminal 100 triggers a local VPN service to establish a VPN tunnel between a first VPN tunnel endpoint and a second VPN tunnel endpoint. The VPN service triggered by the triggerer 110 may be a service provided by an operating system of the user terminal 100. As said, the operating system may also be stored in the memory 104. In certain variants of the present disclosure, the VPN service triggered in step S1-1 comprises at least a VPN client service.

The first VPN tunnel endpoint of the VPN tunnel to be established resides on the user terminal 100. The second VPN tunnel endpoint may either reside on the user terminal 100 or outside the user terminal 100 in the network. As an example, the second VPN tunnel endpoint may reside on the at least one network component 200 or any intermediate network component located between the user terminal 100 and the at least one network component 200.

Triggering of the VPN service to establish the VPN tunnel in step S1-1 may include signalling between the user terminal 100 and the network (e.g., at the least one network component 200 residing in the network). The signalling is indicated in FIG. 2 by a dashed arrow between the user terminal 100 and the network component 200.

Prior to triggering the VPN service to establish the VPN tunnel, the VPN service may also be triggered to be activated. As a result of activation of the VPN service, the VPN service may be started to run on the user terminal 100 and may provide one or more services, functions or interfaces. In one variant, the VPN service is associated with an API (e.g., a VPN API) configured to access data traffic of the further application 104B (e.g., for traffic analysis or traffic marking purposes).

In a further step S1-2 the determiner 112 determines a quality enhancement requirement of the further application 104B. The quality enhancement requirement may relate to at least one of an improved QoS and an improved QoE. If the further application 104B is a media rendering application, the quality enhancement requirement may, for example, relate to an improved media data playout rate, an increased media buffer fill level, or an enhanced start rendering time for the media.

In one variant, the quality enhancement requirement of the further application is determined by an analysis of the data traffic of the further application. That data traffic analysis may be performed via the VPN API provided by the VPN service (as activated in step S1-1). The quality enhancement requirement can also be determined by an analysis of an execution behaviour of the further application 104B. The execution behaviour of the further application 104B can be analysed via an API configured to access data indicative of the execution behaviour of the further application 104B. Such data may, for example, be included in a log file of that application 104B. As said, the quality enhancement requirement may alternatively, or in addition, be determined by an analysis of data traffic of the further application.

In a further step S1-31, the signaler 114 signals the quality enhancement requirement determined in step S1-2 to the network (e.g., via the transmission interface 106). As an example, the quality enhancement requirement may be signalled to the at least one network component 200 as indicated by a dashed arrow in FIG. 2. In case a VPN tunnel has been established in step S1-1, the quality enhancement requirement may be signalled in step S1-31 via that VPN tunnel (e.g., within the VPN tunnel).

There exist various options for signalling the quality enhancement requirement. As an example, the quality enhancement requirement may be signalled to the network by packet marking. To this end, packets generated by the further application 104B may be marked. Packet marking may be performed using the VPN service (e.g., via the VPN API). Packet marking via the VPN service is particularly useful in case of an end-to-end encryption of the data traffic generated by the further application 104B.

The quality enhancement requirement may be signalled in step S1-31 in various ways. In one variant, the quality enhancement requirements signalled in the form of an unspecified notification that indicates that traffic differentiation is required for the user terminal 100 (e.g., for a particular further application 104B). As such, the selection of the actual action to enforce the quality enhancement requirement signalled by the user terminal 100 may be performed within the network (e.g., by the at least network component 200).

As an alternative to signalling of the quality enhancement requirement in step S1-31 or in addition to that signalling, the quality enhancement requirement may in step S1-32 be locally enforced at the user terminal 100 with respect to data traffic (e.g., of the further application 104B) directed to or received from the network. In this regard, the quality enhancement application 104A may be configured to locally enforce the quality enhancement requirement by rate limitation or blocking with respect to data traffic directed towards the network. Alternatively, or in addition, a TCP-related action may be triggered by the quality enhancement application with respect to data traffic from the network. As an example data, packets from the network may be dropped to force TCP to react on this dropping. As a further possibility, transmission of TCP acknowledgments (ACKs) may be delayed to make the network to react on this delay. Step S1-32 is performed by the enhancer 116.

Turning now to the operation of at least one network component 200, a VPN service is triggered by the triggerer 210 in step S2-1 to establish a VPN tunnel between a first VPN tunnel endpoint and a second VPN tunnel endpoint. Step S2-1 is performed by the triggerer 210 and may be responsive to a corresponding triggering event received from the user terminal 100 (e.g., via the reception interface 208). The first VPN tunnel endpoint resides on the user terminal 100. The second VPN tunnel endpoint resides on the at least one network component 200. In one variant, the VPN service triggered in step S2-1 may be a VPN server service.

In an optional step S2-2, signalling with respect to a quality enhancement requirement of the further application 104B residing on the user terminal 100 is received (e.g., via the reception interface 208 of the network component 200). The signalling is received via the VPN tunnel established between the user terminal 100 and the at least one network component 200 and takes the form of an unspecified notification indicating that traffic differentiation is required for the user terminal 100.

Then, in step S2-3, the quality enhancement requirement received from the user terminal 100 via the VPN tunnel is processed by the processor 212. The processing may generally be performed by the same network component that constitutes the second VPN tunnel endpoint, or by another network component in communication with the network component constituting the second VPN tunnel endpoint.

In response to the processing of the quality enhancement requirement, the at least one network component 200 may perform one or more quality enhancement actions to achieve traffic differentiation in favour of the user terminal 100. As an example, data traffic directed towards the user terminal 100 may be prioritized in step S2-31. For example, if the further application 104B residing in the memory 104 of the user terminal 100 is a web browser having requested displayable content comprising multiple objects, in step S2-31 objects requested by the user terminal 100 may be prioritized over objects requested by other user terminals. Such prioritizing may be performed by an object scheduler residing on the network component 200 or any other network component (e.g., a radio access network component).

In addition or as an alternative one or more bearer-related actions may be performed in connection with processing the quality enhancement requirement. As an example, at least one particular bearer for data traffic directed towards the user terminal 100 may be established, or at least one bearer parameter for data traffic directed towards the user terminal 100 may be set, or data traffic may be directed to a particular bearer. All those establishing, setting and directing actions may be performed to prioritize data traffic directed towards the user terminal 100 so as to provide a quality enhancement to the further application 104B residing on the user terminal 100.

In a further step S2-4, the prioritized objects are transmitted (e.g., via the transmission interface 206) to the user terminal 100. In addition, or as an alternative, a particular bearer in accordance with the bearer-related action performed in step S2-31 is used for data traffic towards the user terminal 100.

Then, in an optional step 1-4, the user terminal 100 receives (e.g., via the receiving interface 108) the data traffic, such as the prioritized objects, from the network component 200. Then, in a further optional step S1-5, displayable content is rendered by the user terminal 100 based on the prioritized objects or other data traffic received in step S1-4. As will be appreciated, the prioritizing of objects intended for the user terminal 100 will, for example, reduce a start rendering time and lead to an enhanced QoE. Additionally, the use of additional or particular bearer may increase the data rate from the perspective of the user terminal 100, which, in turn, results in an increased QoS.

Many operating systems (such as Android since Android version 4.0) provide a VPN service (including VPN tunnel establishment) have a built-in VPN service. VPN tunnel establishment therefore does not require any level of support in the user terminal 100 from, for example, its (e.g., cellular) network interfaces 106, 108. As such, the quality enhancement application 104A can be implemented as a program in conventional user memory 104 (such as an app downloadable for different types of user terminals 100 such as smartphones and tablet computers).

The quality enhancement application 104A may be downloaded onto the user terminal 100 or provided upon distribution of the user terminal 100 (e.g., by a network operator also operating the one or more network components 200). Using the quality enhancement application 104A, the network operator may thus provide trusted QoS and/or QoE support for the one or more further applications 104B residing on the user terminal 100 without requiring that these further application 104B themselves perform any particular actions (such as performing the necessary QoS/QoE settings for traffic classifications).

Also, the approach presented herein is easily applicable to end-to-end encrypted traffic emanating from the user terminal 100 as the VPN service residing on the user terminal 100 provides visibility to the quality enhancement application 104A of the (not yet) encrypted data traffic. It will be appreciated that the signalling of the quality enhancement requirement by the user terminal 100 can be controlled on a packet-by-packet basis and/or a packet flow granularity (using, e.g., Differentiated Services Code Points, DSCP markings).

In the following, further embodiments will be described with reference to FIGS. 3 to 9. These further embodiments are based on the general embodiments discussed above with reference to FIGS. 1 and 2. For this reason the same reference numerals will be used to denote the same or similar components. It will be appreciated that the functions, steps and procedures discussed above with reference to FIGS. 1 and 2 could also be implemented in any of the embodiments described below with reference to FIGS. 3 to 9.

Figure 3:
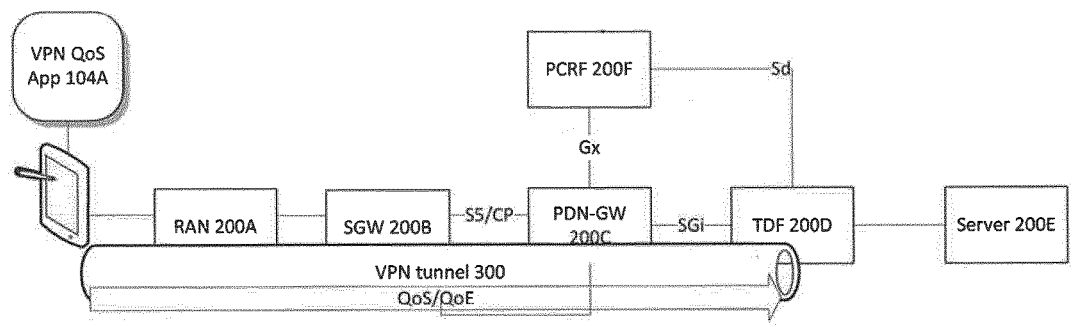
FIG. 3 shows an embodiment of a network architecture configured to implement the present disclosure.

FIG. 3 illustrates an exemplary network architecture in which embodiments of the technique presented herein can be implemented. As illustrated in FIG. 3, the network architecture comprises a user terminal 100 with a quality enhancement application 104A installed thereon and multiple network components including a Radio Access Network (RAN) 200A, a Service Gateway (SGW) 200B, a Packet Data Network Gateway (PDN-GW) 200C, a Traffic Differentiation Function (TDF) 200D, a media server 200E (such as a web server) and a Policy and Charging Rules Function (PCRF) 200F. As likewise illustrated in FIG. 3, an established VPN tunnel 300 stretches between the user terminal 100 and the TDF 200D. The further application 104B residing on the user terminal 100 may be a web browser or any media client (such as a Youtube app) requesting media data from the server 200E.

Figure 4:
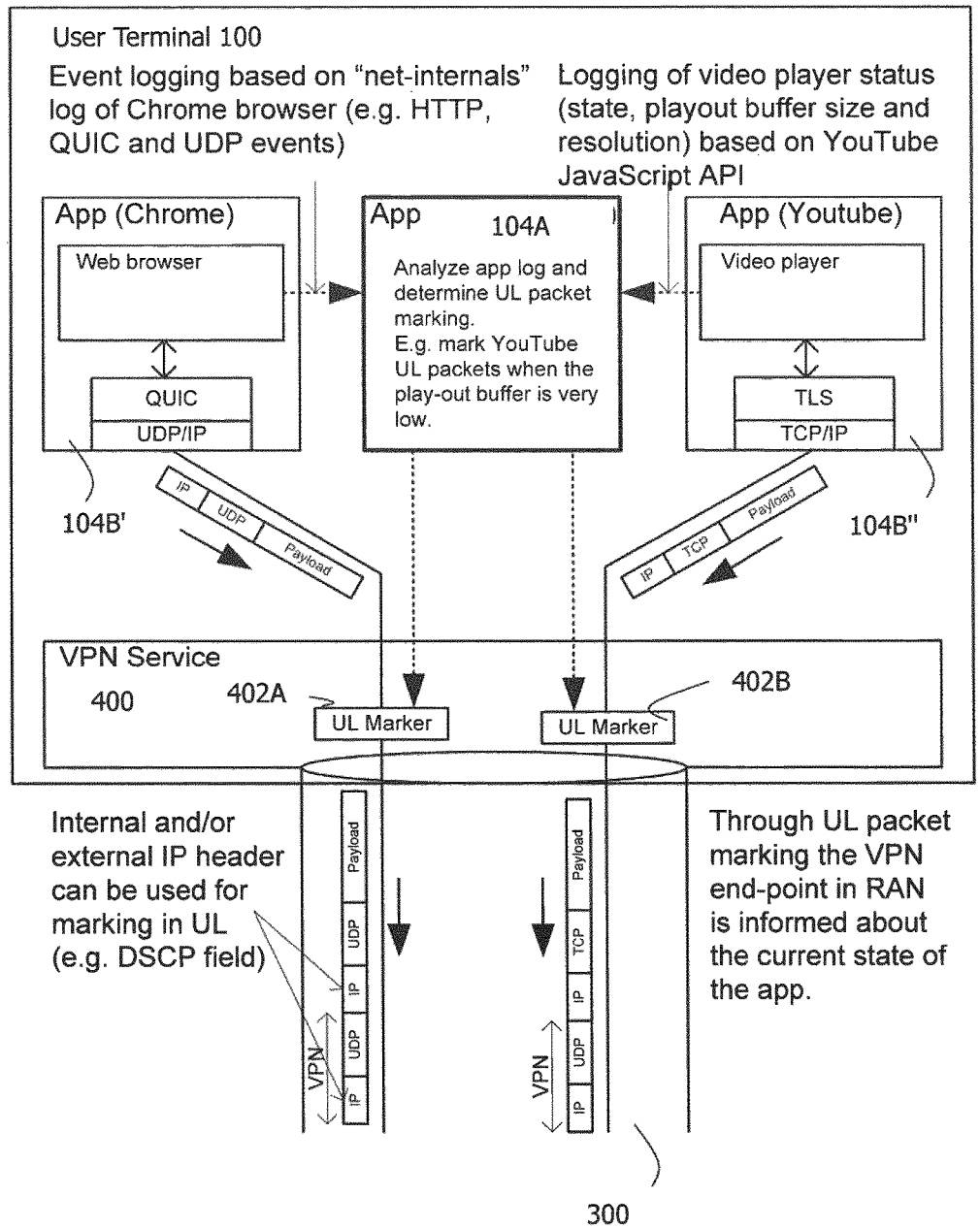
FIG. 4 shows a schematic diagram of an embodiment for user terminal-based packet marking.

FIG. 4 illustrates in more detail the configuration of the first endpoint of the VPN tunnel 300 shown in FIG. 3, namely the user terminal 100. In the exemplary configuration example of FIG. 4, two further applications 104B' and 104B" reside in the memory 104 of the user terminal (in addition to the quality enhancement application 104A). The first further application 104B is a Google™ Chrome™ app including a web browser and a protocol stack with an upper Quick UDP Internet Connections (QUIC) layer interfacing the web browser and a lower User Datagram Protocol (UDP)/Internet Protocol (IP) layer. The second further application 104B" is a Youtube app with a video player and a protocol stack including an upper Transport Layer Security (TLS) layer interfacing the video player and a lower TCP/IP layer.

As illustrated in FIG. 4, the two further applications 104B', 104B" generate data packets with respective headers (UDP/IP and TCP/IP) and payload portions. This data traffic enters the VPN tunnel 300 via a VPN service component 400. The VPN service component 400 may take the form of a VPN client service terminating the VPN tunnel 300 on the side of the user terminal 100. The VPN service component 400 comprises uplink packet markers 402A, 402B configured to receive, mark and forward the data packet flows from the two further applications 104B', 104B", respectively.

In the following, the operation of the user terminal 100 in connection with providing quality enhancements to the two further applications 104B', 104B" will be explained in more detail. It will be appreciated that the following description of an exemplary mode of operation of the user terminal 100 is not restricted to the particular types of further applications 104B', 104B" illustrated in FIG. 4.

In the example of FIG. 4, the quality enhancement application 104A is configured to determine the quality enhancement requirement (see step S1-2 in FIG. 2) by an analysis of an execution behaviour of the further applications 104B', 104B". To this end, the quality enhancement application 104A can access (via dedicated APIs) data generated by the further applications 104B', 104B" and indicative of their execution behaviour. In more detail, the quality enhancement application 104A accesses, via the respective API, data that have been logged by the respective further application 104B', 104B". As for the Chrome™ app 104B', the quality enhancement application 104A may analyse logged Hypertext Transfer Protocol (HTTP), QUIC or UDP events. As for the Youtube app 104B", the quality enhancement application 104A may analyse logged data pertaining to the video player status (i.e., state information, playout buffer size and current resolution).

Based on the data collected by the quality enhancement application 104A, the quality enhancement application 104A determines whether or not any of the further applications 104B', 104B" is in need of a quality enhancement. Should this be the case, the quality enhancement application 104A signals the corresponding enhancement requirement (e.g., in the form of an unspecified notification indicating the requirement of traffic differentiation for the particular further application 104B', 104B") via the VPN tunnel 300 to the network (step S3-1 in FIG. 2).

There exist several alternatives for signalling the quality enhancement requirement. In the example illustrated in FIG. 4, UL packet marking is used. Packet marking may be applied to a particular packet generated by a particular further application 104B', 104B" in various ways, for example by marking a VPN IP header (external IP header) and/or an application IP header (internal or payload IP header) using the uplink markers 402A, 402B. For example, a particular application packet flow (e.g., identified by a particular 5-tuple) can be marked in the uplink as important for a period of time a particular further application 104B', 104B" is running, or for a shorter period of time. The corresponding packet flow can then receive a higher prioritisation in the downlink (DL) by the network. As an example, the TDF 200D in FIG. 3 (i.e., the second endpoint of the VPN tunnel 300) may detect the 5-tuple of the packet flow for a given UL marking and may trigger a corresponding prioritizing filtering in the downlink direction.

It is to be noted that the marking detection and/or prioritizing functionality need not necessarily be implemented by the TDF 200D. Rather, it could also be implemented by any of the other network components illustrated in FIG. 3, such as the RAN 200A, the SGW 200B, the PDN-GW 200C or the PCRF 200F. In certain variants, the PCRF 200F can be used to determine how the quality enhancement requirement signalled by the user terminal 100 is to be translated into a particular traffic differentiation action. As such, bearer and/or marking based traffic differentiation may be under control of the PCRF 200F. The user terminal 100, on the other hand, is relived from providing a detailed set of QuS/QoE related parameters. As such, the user terminal 100 may simply indicate its need for a quality enhancement (e.g., in relation to a particular further application 104B). The exact semantics of the quality enhancement requirement signalling could be defined by network operators.

As an alternative to packet marking, the quality enhancement requirement could also be signalled via the VPN tunnel 300 in other ways. As an example, a dedicated signalling flow could be implemented (e.g., directly from the user terminal 100 to the TDF 200D). In one exemplary realization, one or more particular 5-tuples can be reserved for the signalling of important data traffic by the user terminal 100.

Based on the signalled quality enhancement requirement, the network can initiate various actions (see step S2-3 in FIG. 2). As an example, the network can upprioritize the DL packet flows that correspond to the marked UL packet flows (e.g., over a limited duration while a particular further application 104B is running).

Figure 5:
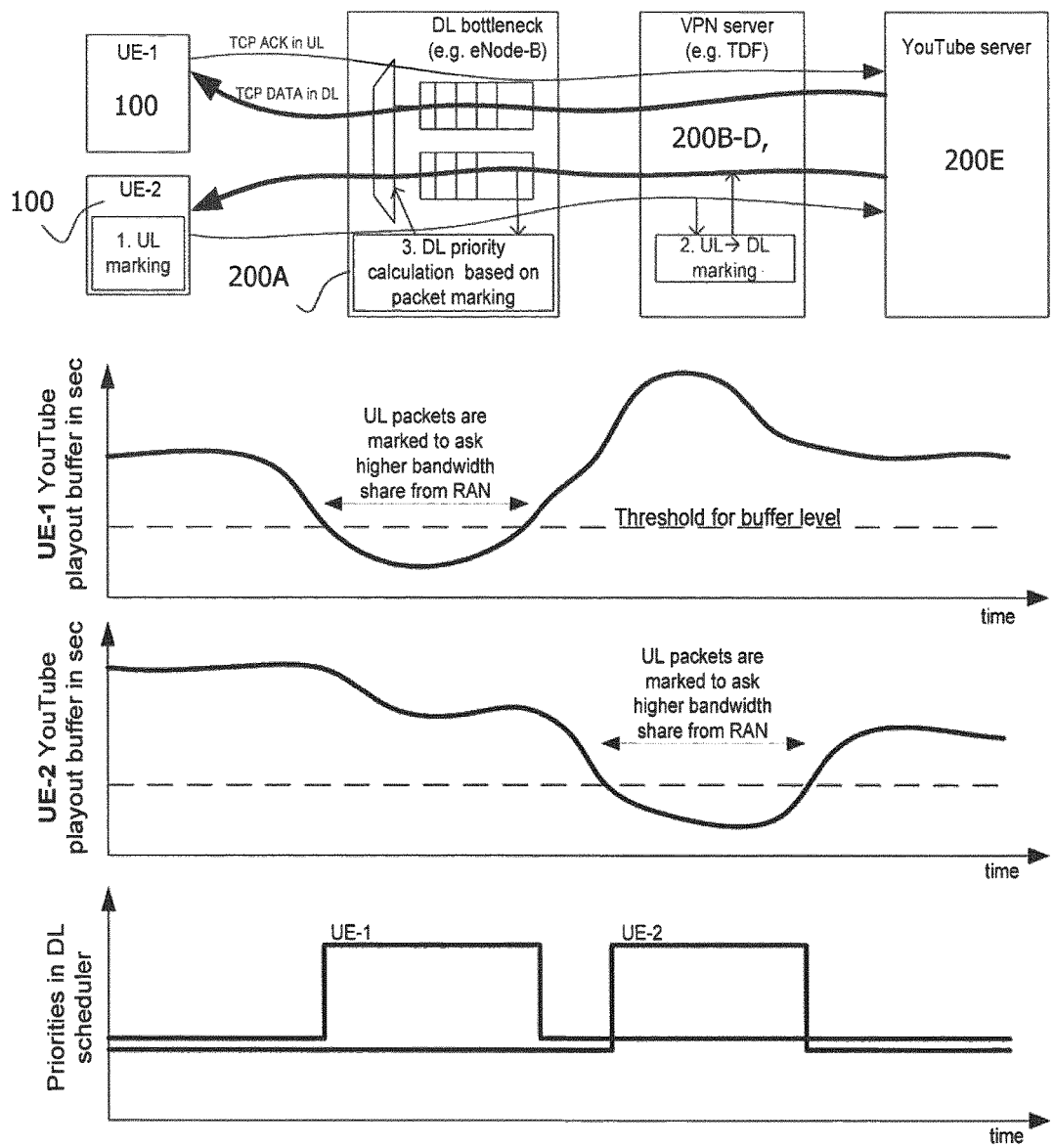
FIG. 5 shows a schematic diagram of an adaptive bandwidth sharing embodiment for multiple applications residing on different user terminals.

An exemplary use case for adaptive bandwidth sharing within the network for two Youtube clients 104B" installed on different user terminals 100 is illustrated in FIG. 5. The two user terminals 100 are referred to as User Equipment (UE-1, UE-2), respectively. The exemplary use case illustrated in FIG. 5 is directed to avoiding a rebuffering on the side of the user terminals 100 so as to increase the QoS and QoE for the Youtube clients 104B" (see FIG. 4).

In more detail, the quality enhancement application 104A constantly monitors the play-out buffer level of the Youtube players installed on the two user terminals 100. If the play-out buffer level falls below a critical level (see the two diagrams in the center of FIG. 5), the respective quality enhancement application 104A controls the corresponding UL marker (reference numeral 402B in FIG. 4) to start with UL packet marking (see step 1 in the upper portion of FIG. 5).

Responsive to the UL packet marking, the VPN service installed, for example, on the TDF 200D performs DL packet marking for the associated DL packet flow (see step 2 in the upper portion of FIG. 5). Responsive to that DL packet marking, DL packets can be prioritized in the network. As an example, DL packets that have been marked can be mapped (e.g., in the PDN-GW 200C or any other network component, such as the RAN 200A) into a different QCI corresponding to a higher priority in the RAN 200A (e.g., an object scheduler), as illustrated in step 3 in the upper portion of FIG. 5.

If the RAN 200A supports packet marking-based traffic differentiation (such as specified for GERAN), then packet marking may also be utilized towards the RAN 200A. Of course, transport QoS mechanisms can also be used (e.g., based on transport or network level packet marking). Regardless of how DL packets are specifically marked, any DL bottleneck, such as a base station (e.g., an eNodeB), can increase the priority for particular marked DL packet flow. In one example, the WFQ weight of a prioritized flow may be increased. In another variant, the network can also perform one or more bearer-related actions, such as establishing bearers, setting of parameters, classification of traffic onto bearer, responsive to a quality enhancement requirement signalling.

Figure 6:
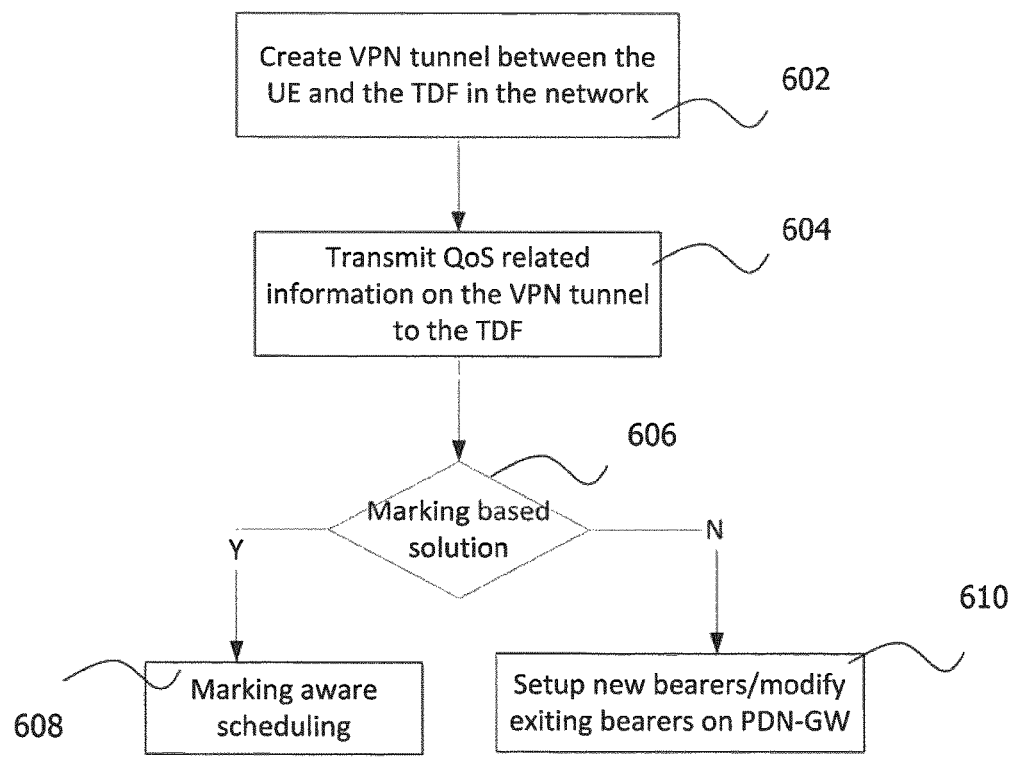
FIG. 6 shows a flow chart illustrating aspects of a method embodiment.

FIG. 6 illustrates a flow chart of another method embodiment that may be implemented in connection with the embodiments described above with reference to FIGS. 1 to 5. Initially, a VPN tunnel (see, e.g., reference numeral 300 in FIGS. 3 and 4) is established in step 602 between the user terminal 100 and the TDF 200D or any other component in the network. Then, information on currently executed further applications 104B is collected by the quality enhancement application 104A.

In one variant, a network operator defines via the quality enhancement application 104A the one or more further applications 104B that are supported with respect to quality enhancement signalling. Of course, a user of the user terminal 100 may also be allowed to define supported applications and/or packet marking rules (at least to a certain degree).

Supported applications are continuously monitored by the quality enhancement application 104A with respect to a quality enhancement requirement. In case a quality enhancement requirement has been determined, corresponding (e.g., QoS-related) information is sent in step 604 on the VPN tunnel 300 to the TDF 200D or any other network component.

In the case of a packet marking-based solution (see decision step 606 in FIG. 6), the network applies a marking-aware traffic scheduling in step 608 (for example in an RAN). If no packet marking-based solution is applied (see again decision step 606 in FIG. 6) new bearers may be set up or existing bearers may be modified (e.g., on the PDN-GW 200C) to provide the requested quality enhancement.

The VPN service exploited by the present disclosure allows to make packets of the at least one other application 104B visible to the quality enhancement application 104A. This also applies for the case that the user terminal 100 utilizes end-to-end encryption for its packets. Furthermore, the VPN tunnel 300 may also be used for signalling quality enhancement requirements towards the network. As will be appreciated, also the collected data may be sent by the quality enhancement 104A via the VPN tunnel 300. For this reason also the transmission of the collected data as such (by the quality enhancement application 104A) may be used for signalling the quality enhancement requirement.

In the following, further embodiments of the present disclosure will be discussed that rely on the VPN service to signal the quality enhancement requirement towards the network. In these embodiments, a VPN tunnel 300 will also be established. However, the VPN tunnel 300 does not stretch into the network. Rather, the VPN tunnel 300 is terminated at the user terminal 100.

Figure 7:
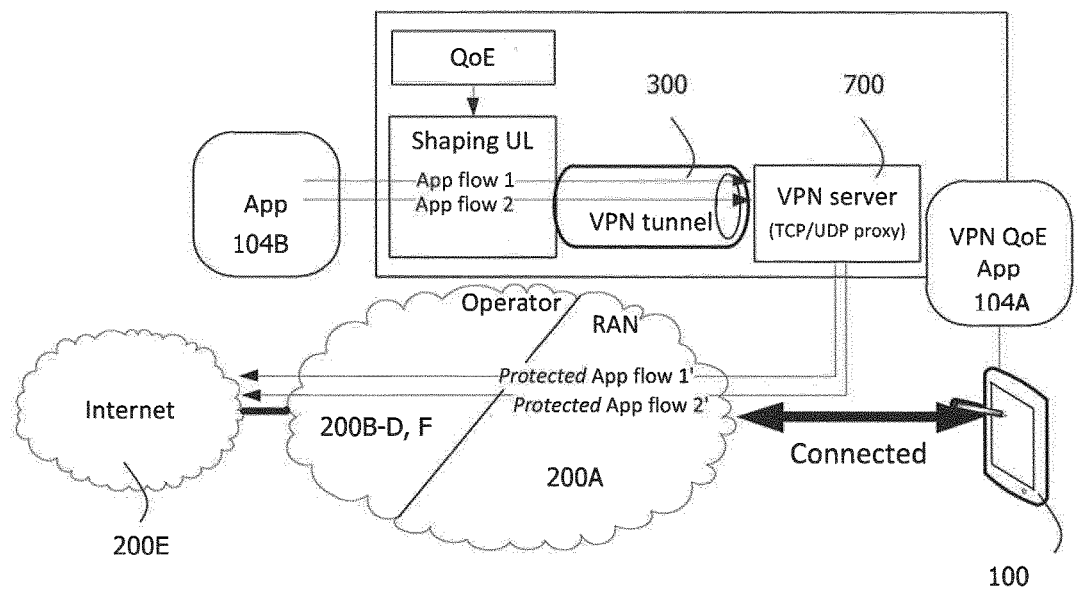
FIG. 7 shows an embodiment of a further network architecture configured to implement the present disclosure.

In the embodiment illustrated in FIG. 7, a VPN server 700 (i.e., the second endpoint of the VPN tunnel 300) resides on the user terminal 100. The advantage of this approach is that the operator network does not require any modification. In the embodiment of FIG. 7, traffic prioritization is achieved within and for an individual user terminal 100 only. In case prioritization between different user terminals 100 (e.g., sharing the same RAN resources) is desired, the solutions discussed above with reference to FIGS. 3 to 6 will be preferred.

With reference to FIG. 7, the VPN server 700 on the user terminal 100 could be realized in a similar manner as a TCP/UDP proxy terminates the flows received via the VPN tunnel 300 and creates protected flows going outside the VPN tunnel 300 (e.g., on-demand). The corresponding operations may be performed using a full TCP stack functionality in the VPN server 700 or a more simple mechanism, for example by copying the TCP stack states as deduced from the application flows.

In the scenario of FIG. 7, the VPN service running on the user terminal 100 may thus be configured to provide both the VPN client and the VPN server 700 so as to locally establish the VPN tunnel 300. Thus, VPN tunnel establishment does in no way effect the network side, but provides the same advantages with respect to VPN-based analysis of end-to-end encrypted data traffic. Thus, packets of any further applications 104B in the uplink can be accessed in the embodiment illustrated in FIG. 7 without requiring any support in the operator network, and the user terminal 100 may locally enforce the quality enhancement requirement (see step S1-32 in FIG. 2).

As shown in FIG. 7, traffic shaping is performed to locally enforce the quality enhancement requirement of a particular further application 104B. There exist various traffic shaping possibilities. For example, UL traffic shaping can be enforced by data rate limitation or by blocking via the quality enhancement application 104A. Also DL traffic shaping can be performed. As an example, implicit DL traffic shaping for TCP flows can be implemented (shaping of TCP ACK in UL-DL traffic is limited). A further possibility for DL traffic shaping by the user terminal 100 for TCP flows may use an incoming buffer for DL traffic in the user terminal 100.

Figure 8:
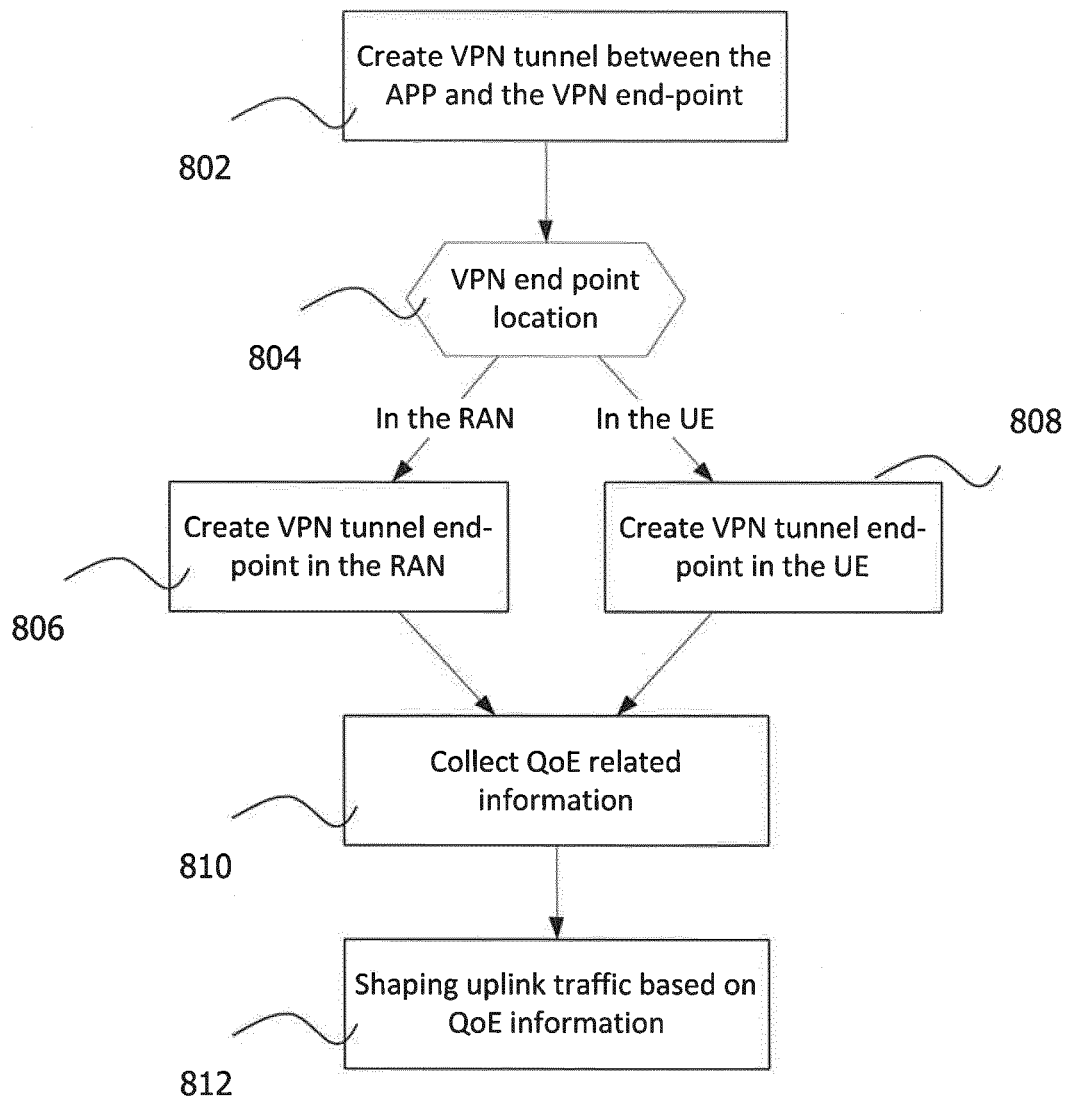
FIG. 8 shows a flow chart illustrating aspects of a still further method embodiment.

FIG. 8 shows a flow diagram of a further method embodiment to selectively request a quality enhancement either from the network (as discussed above with reference to FIGS. 3 to 6) or to enforce the quality enhancement requirement locally by the user terminal (as explained above with reference to FIG. 7).

Initially, establishment of a VPN tunnel 300 is triggered, wherein a first VPN tunnel endpoint resides on the user terminal 100 (see step 802). In step 804, the location of the second VPN tunnel endpoint is selected. In case the second VPN tunnel endpoint is to be located in the network (e.g., in the RAN 200A shown in FIG. 3), in step 806 the second VPN tunnel endpoint is created in the network (such as to reside on the RAN 200A). Otherwise, if it is determined in step 804 that the second VPN tunnel endpoint is to reside in the user terminal 100, the second VPN tunnel endpoint is created in the user terminal 100 in step 808.

In a next step 810, QoE/QoS-related information is collected to determine if the one or more further applications 104B running on the user terminal 100 have a quality enhancement requirement. If such a quality enhancement requirement can indeed be determined, UL traffic shaping is performed in step 812 based on the collected QoE/QoS information as generally explained above (see, e.g., FIG. 7). Of course, as far as UL traffic shaping is concerned, the embodiment discussed above with reference to FIG. 7 can also be combined with any of the embodiments shown in FIGS. 3 to 6.

Figure 9:
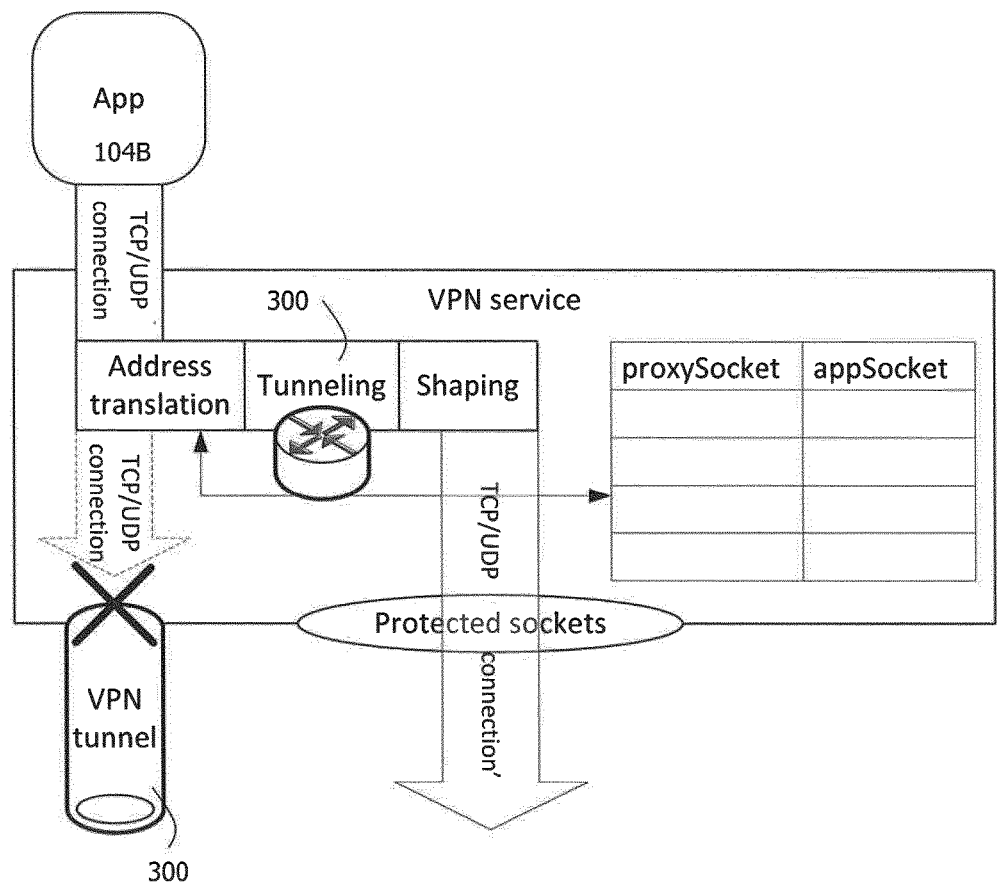
FIG. 9 shows a further embodiment illustrating an implementation of the present disclosure.

FIG. 9 shows a still further embodiment that relies on UL traffic shaping within the user terminal 100. As such, the embodiment illustrated in FIG. 9 can be combined with the embodiment discussed above with reference to FIG. 7.

In a similar manner as the embodiment in FIG. 7, also the embodiment illustrated in FIG. 9 uses the VPN service installed on the user terminal 100, but does not use the VPN service (i.e., a VPN tunnel 300) for data transmission. Again, the application packet flows are recreated in a TCP/UDP proxy-like manner.

In the embodiment illustrated in FIG. 9, socket communication of the one or more further applications 104B is routed at the VPN service layer to a local user space VPN proxy component. This proxy component opens an outgoing socket to the original destination in the network and protects the outgoing connection from being tunneled in the VPN tunnel 300. The traffic payload, on the other hand, is copied from the terminated VPN proxy component to the newly created protected socket. In this regard, a mapping between protected proxy sockets on the one hand and application sockets on the other with corresponding address translation can be performed, as generally illustrated by a schematic mapping table in FIG. 9.

In the embodiment illustrated in FIG. 9, quality enhancement requirements can be signalled and/or enforced in different manners. As an example, packet marking can be done in the UL direction. In this regard, DSCP Type of Service (TOS) information can be transmitted via the packet marking even if the original application 104B did not apply such marking to any of its packets. Alternatively, or in addition, DL packet shaping can be performed by the shaper illustrated in FIG. 9 that intentionally drops DL packets to force TCP to react on this. As a further possibility, the shaper can apply a buffer in the UL that is able to delay the delivery of certain packets (e.g., to delay the ACK transmissions of TCP to make TCP react on these delays).

A pseudocode example for implementing embodiment illustrated in FIG. 9 can read as follows:

The VPN service object provides the following basic objects.

```
VPN service {
  in: file descriptor for UL packet
  out: file descriptor for DL packet
  tunnel: file descriptor of VPN service, communication between
  UE and network
}
```

In a basic VPN service implementation the VPN service has the following code for packet handling:
For UL Packets:
packetUL=in.read( ); //from app
tunnel.write(packetUL);
For DL Packets:
packetDL=tunnel.read( );
out.write(packetDL);
In the proposed solution the VPN service has the following functionality:
For UL Packets:
packetUL=in.read( ); //src: 1.1.1.1:2345, dst:web.org:80
proxySocket=createSocket(packetUL); //src: 1.1.1.1:12345, dst:web.org:80
Map<FiveTuple, FiveTuple>dictionary=new Map( );
dictionary.add(proxySocket, appSocket);
  //src:1.1.1.1:2345, dst:web.org:80 <-> src: 1.1.1.1:12345, dst:web.org:80
tunnel.protect(proxySocket);
payload=packetUL.getPayload( );
proxySocket.write(payload); //payload of the original packet is copied to the protected socket content, the header is set by the createSocket event
For DL Packets:
packetDL=proxySocket.read( );
out.write(fixPacketHdr(packetDL, dictionary)); //the local app has to be able to read the packet header thus the response from web.org to the protected socket has to be exchanged and transmitted to the original socket of the app by src: web.org:80, dst:1.1.1.1:12345 <-> src:web.org:80, dst: 1.1.1.1:2345

As has become apparent from the above embodiments, the technique presented herein permits traffic differentiation (e.g., by a RAN component) based on data traffic analysis and, optionally, classification that is performed in the user terminal by a dedicated (e.g., operator-developed or -controlled) application. In certain variants, the results of the traffic analysis and, optionally, classification are conveyed to the network using a VPN tunnel. In certain variants, UL packet shaping is performed based on information collected from applications currently running on the user terminal. Corresponding analysis and/or enhancement policy enforcement actions can be applied by utilizing a VPN API and, optionally, tunneling the data traffic of other applications to a VPN tunnel.

The disclosure presented herein has the option of using it in "client mode" only, without affecting the operator network. As such, certain variants of the present disclosure do not require any modification in the operator network, or in an operating system of the user terminal. The user terminal may simply download a quality enhancement application (e.g., in the same way as a regular app) so as to realize QoS or QoE enhancements. The present disclosure is also fully compatible with the network-initiated bearer concept.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique terminal presented herein can be varied in many ways, it will be recognized that the invention should be limited only by the scope of the claims that follow.

The invention claimed is:

1. A user terminal, comprising:
    at least one interface configured to connect the user terminal to a wireless communication network located between the user terminal and a media server;
    at least one processor;
    memory coupled to the processor and storing a quality enhancement application and at least one further application for execution by the processor, wherein the quality enhancement application is configured to cause the processor to:
        trigger a Virtual Private Network (VPN) service to establish a VPN tunnel between a first VPN tunnel endpoint on the user terminal and a second VPN tunnel endpoint on the user terminal;

determine a quality enhancement requirement of the further application;

signal the quality enhancement requirement via the VPN tunnel.

2. The user terminal of claim 1, wherein the quality enhancement application is configured to cause the processor to determine the quality enhancement requirement by an analysis of an execution behavior of the further application.

3. The user terminal of claim 2, wherein the further application is associated with a first Application Programming interface (API) configured to access data indicative of the execution behavior of the further application.

4. The user terminal of claim 1, wherein the quality enhancement application is configured to cause the processor to determine the quality enhancement requirement by an analysis of data traffic of the further application.

5. The user terminal of claim 4:
wherein a second Application Programming Interface (API) is provided; and
wherein the second API is configured to access the data traffic of the further application for data traffic analysis.

6. The user terminal of claim 5, wherein the second API is associated with the VPN service.

7. The user terminal of claim 5:
wherein the quality enhancement application is configured to cause the processor to signal the quality enhancement requirement via packet marking;
wherein the quality enhancement application is configured to cause the processor to perform the packet marking using the VPN service.

8. The user terminal of claim 1, wherein the quality enhancement application is configured to cause the processor to signal the quality enhancement requirement via packet marking.

9. The user terminal of claim 8, wherein the quality enhancement application is configured to cause the processor to apply the packet marking to packets sent by the further application.

10. The user terminal of claim 1, wherein the quality enhancement application is configured to cause the processor to locally enforce the quality enhancement requirement at the user terminal with respect to data traffic directed to or received from the wireless communication network.

11. The user terminal of claim 1, wherein the quality enhancement application is configured to cause the processor to signal the quality enhancement requirement via dedicated signaling.

12. The user terminal of claim 1, wherein the VPN service is provided by an operating system of the user terminal.

13. The user terminal of claim 1, wherein the quality enhancement application is configured to cause the processor to signal the quality enhancement requirement on one of a packet-by-packet basis and a packet flow basis.

14. The user terminal of claim 1, wherein the data traffic is end-to-end encrypted data traffic.

15. The user terminal of claim 1, wherein the quality enhancement requirement is an unspecified notification indicating that traffic differentiation is required for the signaling user terminal.

16. A network component in a wireless communication network located between a user terminal and a media server, comprising:
at least one interface configured to be connected to the user terminal;
at least one processor;
memory coupled to the at least one processor and storing at least one program configured to cause the at least one processor to:
trigger a Virtual Private Network (VPN) service to establish a VPN tunnel between a first VPN tunnel endpoint and a second VPN tunnel endpoint, wherein the first VPN tunnel endpoint resides on the user terminal and the second VPN tunnel endpoint resides on the user terminal;
receive a quality enhancement requirement from the user terminal via the VPN tunnel; and
initiate a quality enhancement action by the wireless communication network responsive to the quality enhancement requirement.

17. The network component of claim 16, wherein the quality enhancement requirement is an unspecified notification indicating that traffic differentiation is required for the signaling user terminal.

18. The network component of claim 16, wherein the at least one program is further configured to cause the network component to perform the quality enhancement action in response to the processing of the quality enhancement requirement.

19. The network component of claim 18, wherein the quality enhancement action includes at least one of:
prioritizing data traffic directed towards the user terminal;
associating data traffic directed towards the user terminal with a particular Channel Quality Indication;
associating data traffic directed towards the user terminal with a particular Weighted Fair Queuing weight;
establishing at least one particular bearer for data traffic directed towards the user terminal;
setting at least one bearer parameter for data traffic directed towards the user terminal; and
classifying data traffic directed towards the user terminal onto at least one particular bearer.

20. The network component of claim 16, wherein the first network component is a Traffic Differentiation Function configured to also process the quality enhancement requirement.

21. The method of claim 16 wherein the quality enhancement action comprises marking-aware scheduling by a second network node in the wireless communication network.

22. The method of claim 16 wherein the quality enhancement action comprises setting up or modifying a radio bearer by a second network node in the wireless communication network.

23. A system, comprising:
a user terminal, comprising:
at least one first interface configured to connect the user terminal to a wireless communication network located between the user terminal and a media server;
at least one first processor;
first memory coupled to the at least one first processor and storing a quality enhancement application and at least one further application for execution by the processor, wherein the quality enhancement application is configured to cause the at least one first processor to:
trigger a Virtual Private Network (VPN) service to establish a VPN tunnel between a first VPN tunnel endpoint and a second VPN tunnel endpoint, wherein the first and second VPN tunnel endpoints reside on the user terminal;
determine a quality enhancement requirement of the further application;

signal the quality enhancement requirement via the VPN tunnel to the wireless communication network;

a network component in the wireless communication network, comprising:
at least one second interface configured to be connected to the user terminal;
at least one second processor;
second memory coupled to the at least one second processor and storing at least one program configured to cause the at least one second processor to:
trigger the VPN service to establish the VPN tunnel between the first VPN tunnel endpoint and the second VPN tunnel endpoint;
receive the quality enhancement requirement from the user terminal via the VPN tunnel; and
initiate a quality enhancement action by the wireless communication network responsive to the quality enhancement requirement.

24. A method of operating a user terminal, the user terminal comprising at least one interface configured to connect the user terminal to a wireless communication network located between the user terminal and a media server, at least one processor and memory coupled to the processor, the memory storing at least one application for execution by the processor, wherein the method comprises:
triggering a Virtual Private Network (VPN) service to establish a VPN tunnel between a first VPN tunnel endpoint and a second VPN tunnel endpoint, wherein the first VPN tunnel endpoint resides on the user terminal and the second tunnel endpoint resides on the user terminal;
determining a quality enhancement requirement of the application;
signaling the quality enhancement requirement via the VPN tunnel.

25. A method of operating a network component in a wireless communication network located between a user terminal and a media server, the network component comprising at least one interface configured to be connected to a user terminal, at least one processor, and memory coupled to the at least one processor, the method comprising:
triggering a Virtual Private Network (VPN) service to establish a VPN tunnel between a first VPN tunnel endpoint and a second VPN tunnel endpoint, wherein the first VPN tunnel endpoint resides on the user terminal and the second VPN tunnel endpoint resides on the user terminal;
receiving a quality enhancement requirement received from the user terminal via the VPN tunnel; and
initiate a quality enhancement action by the wireless communication network responsive to the quality enhancement requirement.

26. A non-transitory computer readable recording medium storing a computer program product for controlling operation of a user terminal, the user terminal comprising at least one interface configured to connect the user terminal to a wireless communication network located between the user terminal and a media server, at least one, processor and memory coupled to the processor, the memory storing at least one application for execution by the processor, the computer program product comprising software instructions which, when run on processing circuitry of the user terminal, causes the user terminal to:
trigger a Virtual Private Network (VPN) service to establish a VPN tunnel between a first VPN tunnel endpoint and a second VPN tunnel endpoint, wherein the first VPN tunnel endpoint resides on the user terminal and the second tunnel endpoint resides on the user terminal;
determine a quality enhancement requirement of the application;
signal the quality enhancement requirement via the VPN tunnel.

27. A non-transitory computer readable recording medium storing a computer program product for controlling operation of a network component in a wireless communication network located between the user terminal and a media server, the network component comprising at least one interface configured to be connected to a user terminal, at least one processor, and memory coupled to the at least one processor, the computer program product comprising software instructions which, when run on processing circuitry of the network component, causes the network component to:
trigger a Virtual Private Network (VPN) service to establish a VPN tunnel between a first VPN tunnel endpoint and a second VPN tunnel endpoint in the wireless communication network, wherein the first VPN tunnel endpoint resides on the user terminal and the second VPN tunnel endpoint resides on the user terminal;
receive a quality enhancement requirement received from the user terminal via the VPN tunnel; and
initiate a quality enhancement action by the wireless communication network responsive to the quality enhancement requirement.

* * * * *